C. S. BARON.
RECEPTACLE TOP.
APPLICATION FILED OCT. 23, 1908.
949,053.
Patented Feb. 15, 1910.
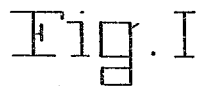
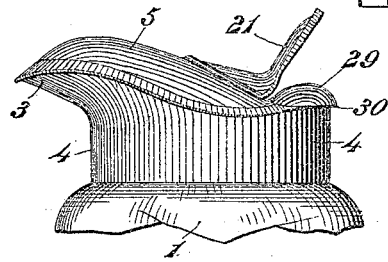
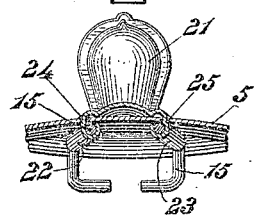
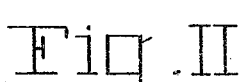
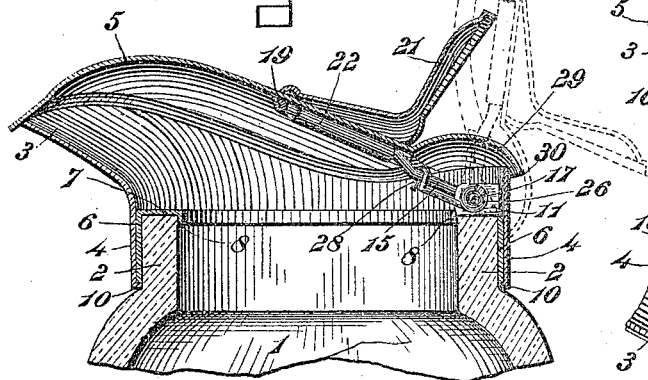
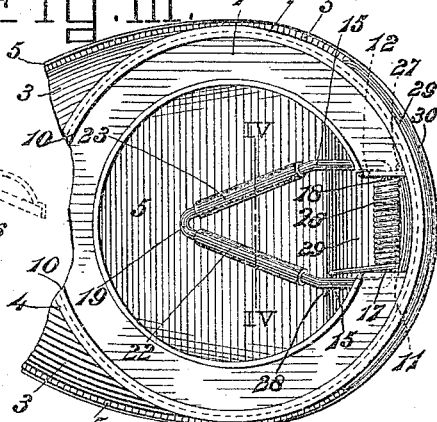
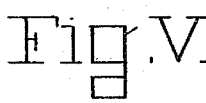
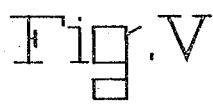
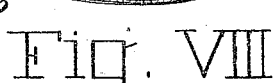
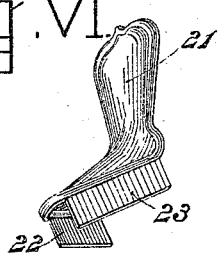
WITNESSES:
INVENTOR:
Charles S. Baron
BY
ATTORNEY.

UNITED STATES PATENT OFFICE.

CHARLES S. BARON, OF TIFFIN, OHIO.

RECEPTACLE-TOP.

949,053.  Specification of Letters Patent.  Patented Feb. 15, 1910.

Application filed October 23, 1908. Serial No. 459,223.

*To all whom it may concern:*

Be it known that I, CHARLES S. BARON, of Tiffin, in the county of Seneca, State of Ohio, have invented certain new and useful Improvements in Receptacle-Tops, of which the following is a specification.

The object of my invention is to produce improvements in tops or covers for pitchers, jugs, mugs, or other receptacles, wherein means are provided for the perfect closure of the top at all points when not required to be open for use, for keeping the lid yieldingly closed, and for assembling the metallic parts which constitute the cover not only without the aid of solder, but by instrumentalities contained within and concealed by the cover.

What constitutes my invention will be hereinafter specified in detail and succinctly set forth in the appended claims.

In the accompanying drawing, which constitutes a part of this specification, Figure I is a side elevation of the upper part of a jug provided with one of my covers, and showing the lid of the cover closed. Fig. II is a section, on an enlarged scale, of the jug shown in Fig. I extending from end to end of the lid. The lid is shown in full lines in its closed or normal position, and in dotted lines in its fully open position, the end of the lid shown in dotted lines being broken away. Fig. III is a bottom plan view, on an enlarged scale, partly broken away, of the subject matter of Fig. I with the jug omitted and illustrating the lid-actuating-mechanism. Fig. IV is a section on the line IV—IV of Fig. III. Fig. V is a view of the rear portion of the lid, detached and stripped of all accessories. Fig. VI is a perspective view of the thumb-piece detached and in shape ready to be applied to the slots in the lid, which are shown in Fig. V ready for its reception. Fig. VII is a perspective view of the movable hinge-member, detached. Fig. VIII is a perspective view of the lid-actuating-spring, detached.

Referring to the numerals on the drawing, 1 indicates the body of a syrup jug, which is illustrated as a representative of any receptacle to which my invention may be serviceably applied. The receptacle is provided with a neck 2 (see Fig. II) to which my top or cover is secured. It may be here mentioned that the term "top or cover" is used in this specification as comprehending that assemblage of members which constitutes in its entirety a cover for a receptacle and not in the more restricted sense of the term to which the name "lid" is appropriated. The cover comprehends a spout 3, provided with a depending skirt or outside collar 4, and surmounted by a hinged, and preferably spring-actuated, lid 5.

The means employed for securing the spout, which is usually made of metal and preferably of tin or tinned sheet iron, to the receptacle or jug 1 constitutes an important feature of my invention, and may be understood from the following description.

Ordinarily the spouts of jug tops or the like are provided with a collar corresponding with the skirt 4, which is secured around the neck 2 as by the aid of cement, crimping or beading of the metal, or other appliances or devices suitable for the purpose. By my present invention I provide within the skirt 4 and around the neck 2 an inside collar 6, which, being preferably provided with a cap-ring 7 and an inside annular flange 8, both as a means for effecting the security of its union to the neck 2 as well as for the sake of a finish to the top of the neck, is secured firmly in position about the neck, and when so secured affords a seat and anchorage for the spout 3, which is secured to the neck indirectly only and through the mediation of the collar to which the skirt 4 is directly secured.

The means relied upon for effecting the secure union between the skirt 4 or outside collar and the inside collar 6 is to form the one to slip snugly upon the other, and to inturn or bead the lower edge of the skirt 4 under the lower edge of the inside collar 6, as indicated at 10. By the aid of the bead or inturned flange shown at 10, a perfect union of the members 4 and 6 is effected. It is obvious that the beading or inturning indicated at 10 may be made before or after the setting of the collar 6 upon the neck 2, as preferred.

When the collar 6, spout 3 with its skirt 4, and the jug are assembled, the spout 3 completely surrounds the ring 7 as by a wall. Directly opposite the discharge end of the spout 3, I provide as by the dividing of the ring 7 and the cutting away of it from the collar 6, a pair of ears 11 and 12 (compare Figs. II and III), which confined within and concealed by the spout constitute the stationary hinge-member which unites the lid to the spout. The term "stationary hinge member" is employed, of course, to denote the member which, in the operation of the hinge, may be regarded as fixed, inasmuch as the operation of the hinge depends not upon its movement but upon the movement of the correlative member of the spring which carries the lid 5. The lid 5 itself is, in effect, the correlative member of the hinge, of which the ring 7 being secured to the jug 1 is the fixed member, but I prefer to hinge the lid to the ears 11 and 12 through the instrumentality of a bifurcated hinge-member 15. The member 15 is preferably made of wire, shaped, as indicated in Fig. VII, at one end in an acute angled bend 16, and at the other end in oppositely projecting inturned pintle-pieces 17 and 18. The pintle-pieces enter apertures provided for them, respectively, in the ears 11 and 12 so that when the member 15 is secured to the lid 5, the lid may turn upon the members 17 and 18 as upon a pintle, but without employment of the usual separate hinge pin. My present device affords a pleasing finish for the article at the corners of the hinge-member which is made all of one piece. The angled end 16 of the member 15 is disposed as by a bend, 19, in the member 15, and, as clearly shown in Fig. II, snugly against the inner face of the lid 5.

It is particularly desirable in articles made of tinned sheet metal to avoid the use of heat in the assembling of the parts, for the reason that heat may discolor and deface the surface of the metal. This, however, is but one of the advantages incident to the employment of the means which I use for securing the member 15 to the lid 5. Such means consist in providing a thumb-piece 21 with depending wings 22 and 23 disposed to register with slots 24 and 25 in the lid 5. The slots 24 and 25 in turn register with the sides of the angled bend 16 of frame 15 (compare Figs. III and IV) so that when the wings 22 and 23 are inserted into their respective slots they may be beaded about the wire of the member 15, as clearly shown in Figs. III and IV, so as to secure on the top of the lid the thumb-piece 21 and against the underside of the lid the member 15. The beading of the wings 22 and 23 serves to securely assemble the parts in the manner specified, and present, in the finished article, no material obstruction either to the sense of sight or to the sense of touch.

To render the lid spring-actuated toward the closed position, I prefer to employ a coiled spring 26, mounted around the pintle-pieces 17 and 18 between the ears 11 and 12 (see Fig. III). One end of the spring 27 engages with the ear 11, for example, and the other end 28 is hooked to engage the member 15, and through the resiliency or power of the spring draws the lid yieldingly against the spout 3.

It is a distinctive and important feature of my invention that every part of the hinge mechanism that unites the lid to the receptacle is entirely covered and concealed by the spout and the lid when the lid is closed. The result is not only an attractive appearance, but a construction which affords security against the intrusion of minute insects, such as ants or the like.

To accommodate the contour of the rear of the spout and to afford a stop piece to the opening movement of the lid, I prefer to provide in the rear of the lid a convex apron 29, whose rear edge 30 engages the rear surface of the spout, when the lid is opened under pressure applied to the thumb-piece 21, and brings it to a full stop.

The material of which the several parts of my cover are made has been specified as being of metal. The skirt, outside collar, spout, lid, and thumb-piece may all be stamped out of tinned sheet metal, while the member 15 and the spring 26 are preferably made of tinned wire. Obviously the metal used may be varied at will, as may be the material of which the receptacle 1 is manufactured. Ordinarily, the receptacle is made of glass or fictile material, and the cover is made of metal; but it is wholly feasible to make the entire article of one material, and in such case to hinge the lid directly to the receptacle without the intervention of the collar and spout construction specified, which construction, however, in the composite article possesses important novelty and utility, as has been set forth.

What I claim is:

1. The combination of the spout provided with a skirt, a collar within the skirt such collar having a cap ring and an inside annular flange, the skirt having its lower edge beaded or inturned under the lower edge of the collar.

2. The combination of the lid having slits therein, a thumb-piece secured to the outside of the lid and having wings passing through the slots and a hinge member engaging such wings on the under side of the lid.

In testimony whereof I have hereunto signed my name in the presence of two subscribing witnesses.

CHARLES S. BARON.

Witnesses:
 RUSH ABBOTT,
 ELIZABETH HERSHBERGER.